US008789041B2

(12) United States Patent
Verma

(10) Patent No.: US 8,789,041 B2
(45) Date of Patent: Jul. 22, 2014

(54) METHOD AND SYSTEM FOR BULK AUTOMATED VIRTUAL MACHINE DEPLOYMENT

(75) Inventor: Navneet Verma, Ashburn, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 841 days.

(21) Appl. No.: 12/642,402

(22) Filed: Dec. 18, 2009

(65) Prior Publication Data

US 2011/0154320 A1    Jun. 23, 2011

(51) Int. Cl.
  *G06F 9/455*  (2006.01)
  *G06F 9/46*   (2006.01)
  *G06F 15/173* (2006.01)
  *G06F 9/445*  (2006.01)

(52) U.S. Cl.
  CPC .............. *G06F 9/45558* (2013.01); *G06F 8/60* (2013.01)
  USPC ................................ 718/1; 718/104; 709/226

(58) Field of Classification Search
  None
  See application file for complete search history.

(56) References Cited

U.S. PATENT DOCUMENTS

| | | | | |
|---|---|---|---|---|
| 2005/0034125 | A1* | 2/2005 | Guy et al. ...................... | 718/100 |
| 2008/0163171 | A1* | 7/2008 | Chess et al. ................... | 717/120 |
| 2008/0184229 | A1* | 7/2008 | Rosu et al. ..................... | 718/1 |
| 2009/0204961 | A1* | 8/2009 | Dehaan et al. ................. | 718/1 |
| 2009/0282404 | A1* | 11/2009 | Khandekar et al. ............ | 718/1 |
| 2009/0313620 | A1* | 12/2009 | Sedukhin et al. .............. | 718/1 |
| 2010/0100881 | A1* | 4/2010 | Shigeta et al. ................. | 718/1 |
| 2010/0281478 | A1* | 11/2010 | Sauls et al. ..................... | 718/1 |

OTHER PUBLICATIONS

Wikipedia, "Memory Virtualization", en.wikipedia.org/wiki/Memory_virtualization, Jan. 5, 2010, 4 pages.
Wikipedia, "Virtual Machine", en.wikipedia.org/wiki/Virtual_machine, Mar. 15, 2010, 8 pages.

* cited by examiner

*Primary Examiner* — Meng An
*Assistant Examiner* — Tammy Lee

(57) ABSTRACT

A client device receives a first request to create a number of virtual devices, where the first request includes specification information corresponding to the number of virtual devices; receives a selection of two or more virtual devices resulting in two or more selected virtual devices; receives a second request to perform a bulk deployment operation on the two or more selected virtual devices; and causes, in response to the second request, the two or more selected virtual devices to be automatically and concurrently deployed, resulting in two or more deployed virtual devices, in accordance with the specification information associated with the two or more selected virtual devices. The client device receives a third request to perform a production operation on a deployed virtual device of the two or more deployed virtual devices; and causes, in response to the third request, the deployed virtual device to be automatically powered up, resulting in a production virtual device.

21 Claims, 11 Drawing Sheets

VM CREATE > SPECIFICATION

VM Details

*Location Information*

| | |
|---|---|
| Hostname | fiddtest03v |
| Physical Data Center | fairland |
| Virtual Center | fldp1svcs03.v.com(B) |
| Logical Data Center | non-prod – ehnet |
| Domain/Environment | ehnet |

*Project Information*

| | |
|---|---|
| Project Name | vmtest |
| Build Engineer | j. smith |
| Comment | |

*Guest Information*

| | |
|---|---|
| IP Address | 1.1.1.1 |
| SubNetMask | 1.1.1.1 |
| Gateway | 1.1.1.1 |
| Applications | App. A and B |
| Operating System | WS (2003) |

VM Resource Details — 405
Verify values before saving

| CPU Quantity | 1 | Disk1 Size (GB) | 2 |
| RAM Size (GB) | 1 | Disk2 Size (GB) | 2 |
| | | Disk3 Size (GB) | 2 |

VM Resource Limits — 410

| CPU Quantity | 2 | Disk1 Size (GB) | 15 |
| RAM Size (GB) | 2 | Disk2 Size (GB) | 3 |

415

VM Maintenance Schedule — 420

| Frequency | Month | Week | Day |
| Time | HH:MM | Duration | HH:MM |

VM Patching Schedule — 425

| Frequency | Month | Week | Day |
| Time | HH:MM | Duration | HH:MM |

[Save] — 430   [Save & Repeat] — 435   [Clear] — 440

Fig. 4

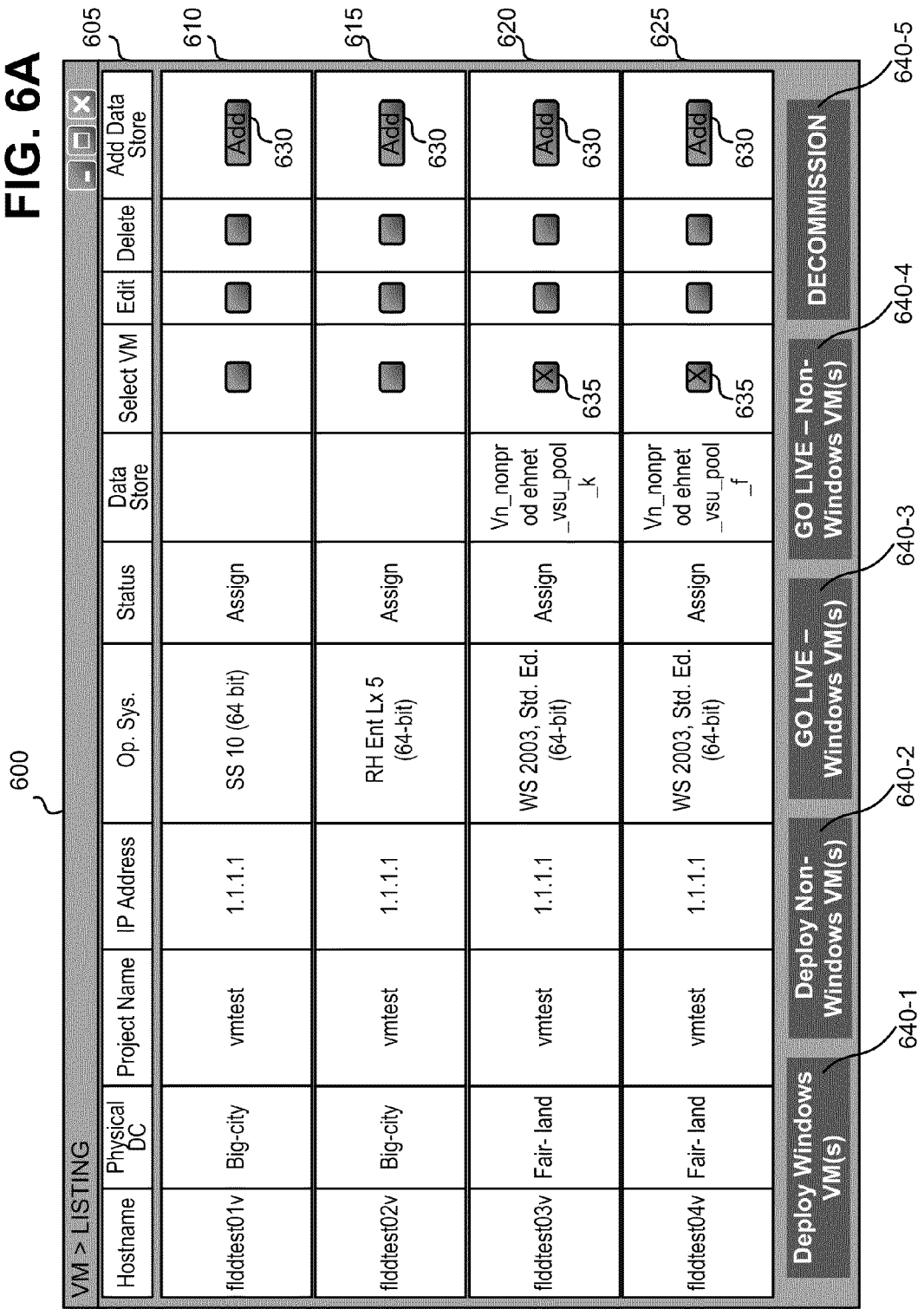

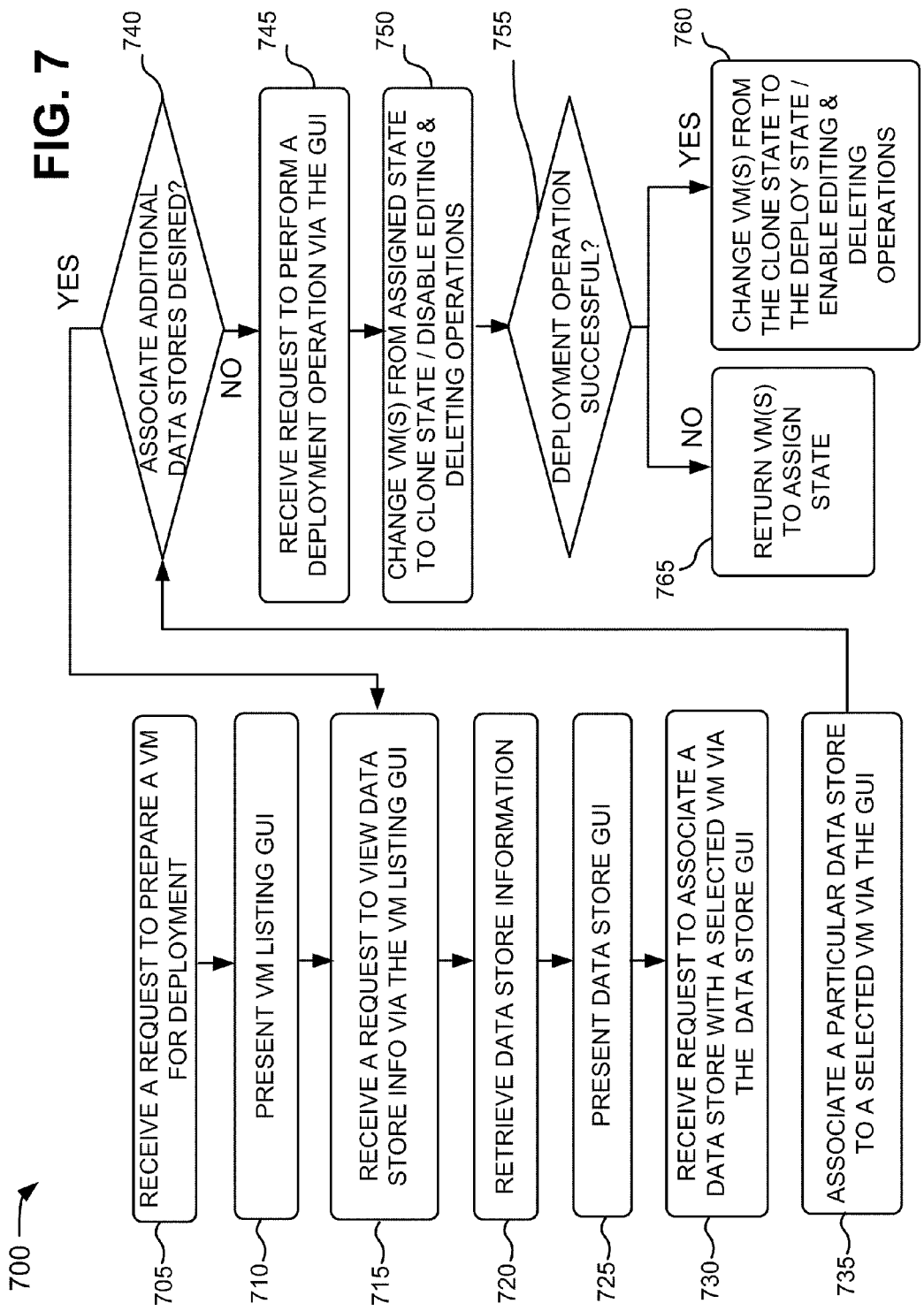

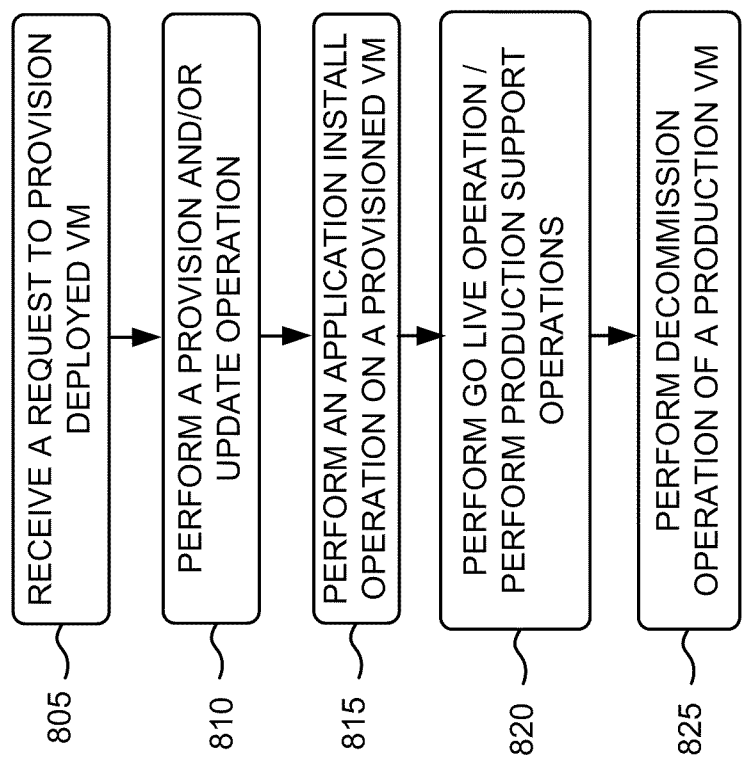

VM UPDATE > SPECIFICATION — 900

VM Details

Location Information
- Hostname: friddtest03v
- Physical Data Center: fairland
- Virtual Center: fldp1svcs03.v.com (B)
- Logical Data Center: non-prod - ehnet
- Domain/Environment: ehnet Project Information
- Project Name: vmtest
- Build Engineer: j..smith
- Comment:

Guest Information
- IP Address: 1.1.1.1
- SubNetMask: 1.1.1.1
- Gateway: 1.1.1.1
- Applications: App. A and B
- Operating System: WS (2003)

VM Resource Details
Verify values before saving
- CPU Quantity: 1    Disk1 Size (GB): 2
- RAM Size (GB): 1   Disk2 Size (GB): 2
                     Disk3 Size (GB): 2

VM Resource Limits
- CPU Quantity: 2    Disk1 Size (GB): 15
- RAM Size (GB): 2   Disk2 Size (GB): 3

VM Maintenance Schedule
- Frequency: Month   Week   Day
- Time: HH:MM   Duration: HH:MM

VM Patching Schedule
- Frequency: Month   Week   Day
- Time: HH:MM   Duration: HH:MM

— 910

Save — 920      Config./Reconfig.    Listing    Close — 925

FIG. 9

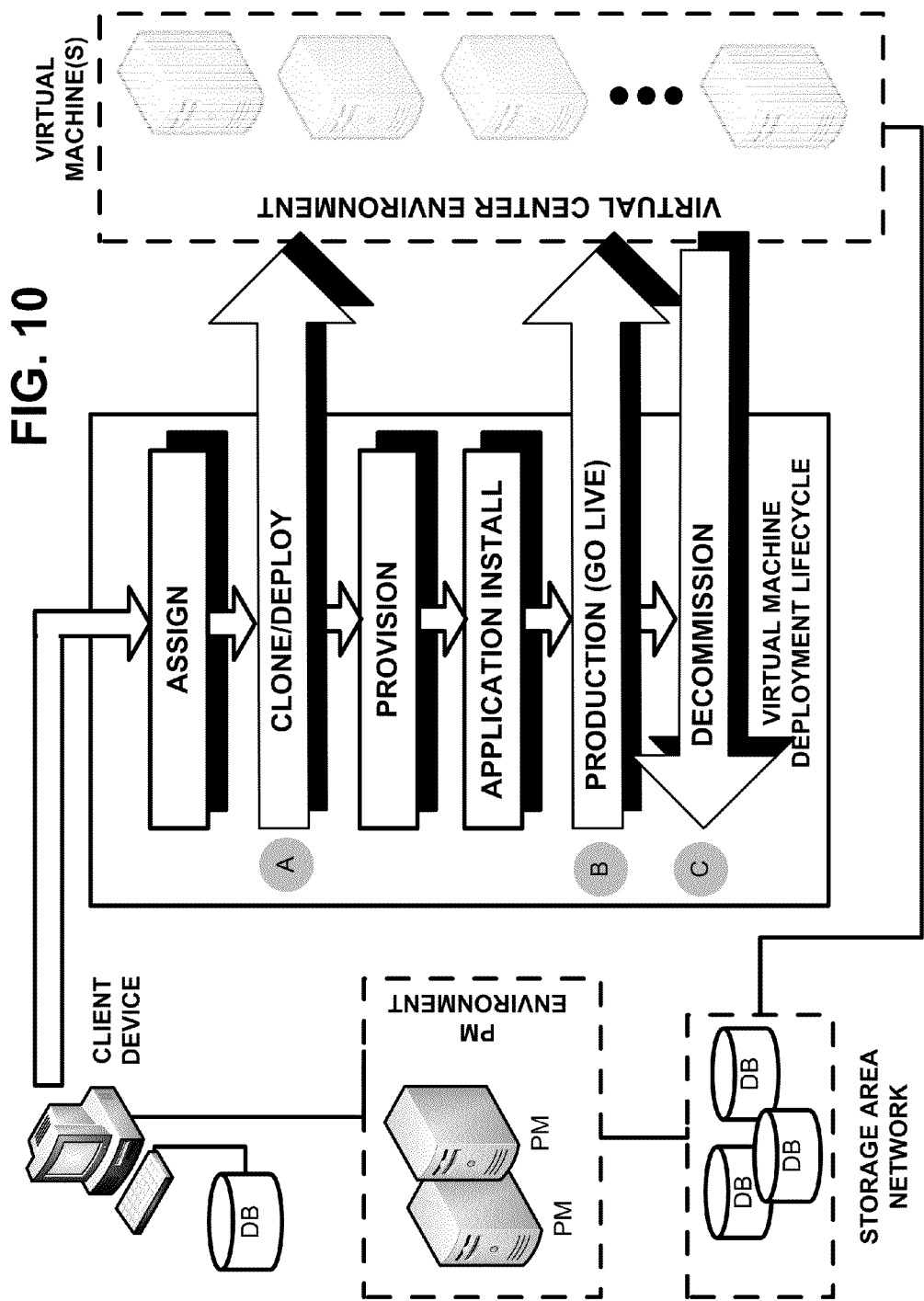

METHOD AND SYSTEM FOR BULK AUTOMATED VIRTUAL MACHINE DEPLOYMENT

BACKGROUND INFORMATION

The deployment of virtual machines within a network is an effective way of improving the network's architectural flexibility, operational efficiency or quality of service. Many organizations are deploying virtual machines in server consolidation programs to reduce network operations and maintenance costs, while maintaining, or expanding, network capability and capacity. Moreover, virtual machines are often deployed, within a network utilizing a particular operating system, to provide services to multiple clients with varying operating systems, network security protocols, or information/data management requirements. Virtual machines, therefore, can be customized and deployed within a network to meet the needs of multiple clients or to address varying client requirements, while avoiding the cost and complexity associated with expanding networks or proliferating underlying network devices.

BRIEF DESCRIPTION OF THE DRAWINGS

FIG. 4 is a diagram of an exemplary virtual machine specification graphical user interface capable of being presented on the client device of FIG. 2;

FIG. 6A is a diagram of an exemplary virtual machine listing user interface capable of being presented by the client device of FIG. 2;

FIG. 7 is a flowchart of an exemplary process for performing an automated virtual machine deployment operation;

FIG. 8 is a flow chart of an exemplary process for performing additional virtual machine development lifecycle operations;

FIG. 9 is a diagram of an exemplary virtual machine update user interface capable of being presented on the client device of FIG. 2; and FIG. 10 is a simplified diagram of exemplary automatic bulk virtual machine deployment, production and decommission operations.

DETAILED DESCRIPTION OF PREFERRED EMBODIMENTS

Figure 1:
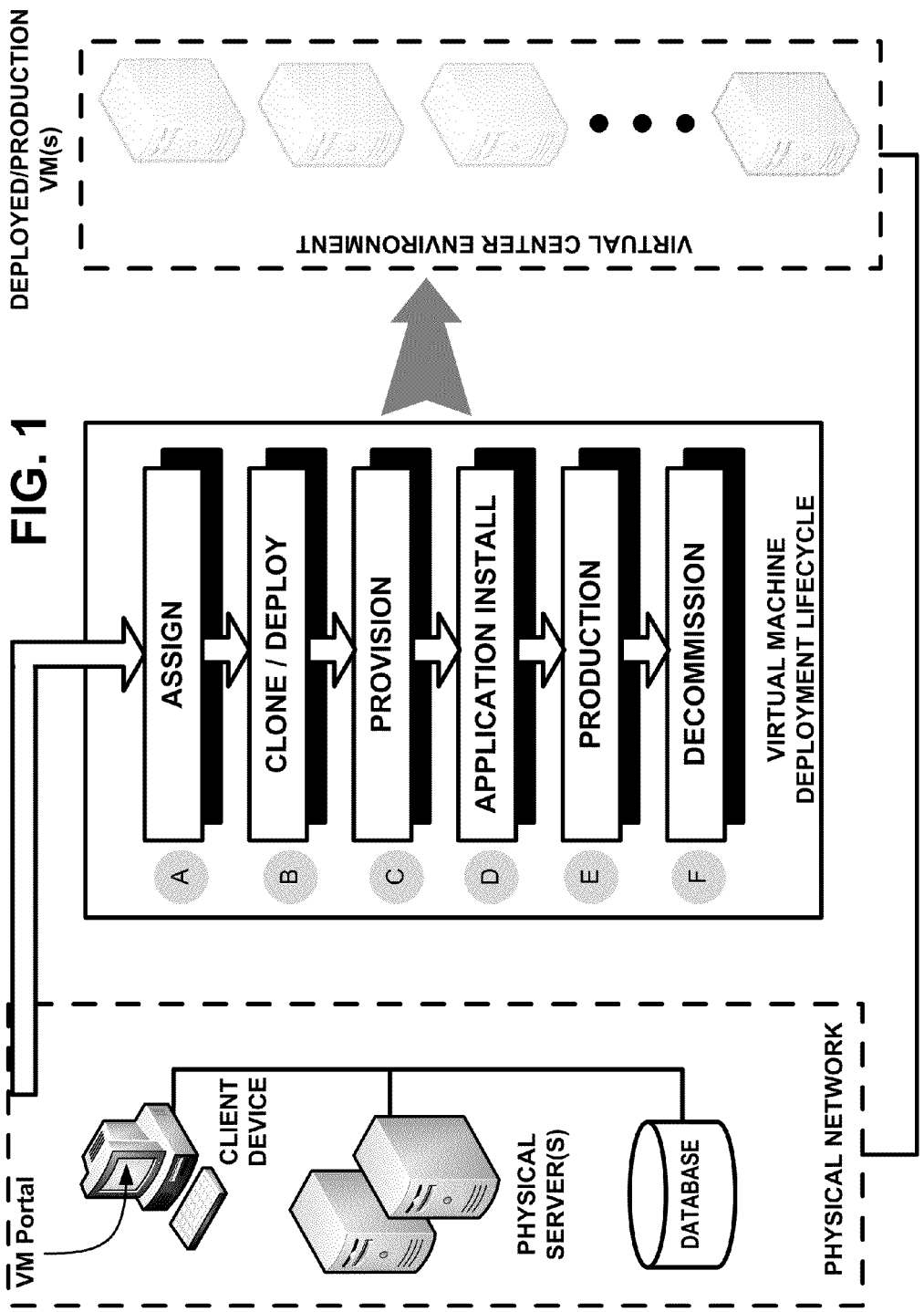
FIG. 1 is a diagram of an overview of an automated virtual machine deployment implementation described herein.

The following detailed description refers to the accompanying drawings. The same reference numbers in different drawings may identify the same or similar elements. Also, the following detailed description does not limit the invention.

Systems and/or methods described herein may provide an automated virtual machine deployment function that enables the automated performance of one or more operations associated with the virtual machine development lifecycle. The virtual machine (VM) deployment function (hereinafter, referred to as "VM function") may save network lifecycle costs by automating operations associated with the virtual machine development lifecycle and/or by enabling the concurrent and/or bulk deployment, production, and/or decommission of multiple VMs within a network. The term, "virtual machine development lifecycle" (hereinafter, referred to as "VM lifecycle"), as used herein, is to be broadly interpreted to include any number of states, phases and/or steps, etc., associated with the life and/or lifecycle of a virtual machine, from conception to disposal within a network.

As one example, the VM function may create a VM by enabling a user to develop custom specification information for a VM to be deployed within a network, in response to a particular user requirement. The VM function may enable the specification information to be assigned to, and/or data storage resources (e.g., data stores) to be associated with, a created VM in preparation for a VM deployment operation.

As another example, the VM function may enable a user to automatically deploy a VM to a network. Furthermore, the VM function may enable the user to perform a bulk deployment operation, in which multiple VMs may be automatically and/or concurrently deployed, by a single click of a button, to a network.

As described herein, the VM function may enable the provisioning of deployed VMs by adding the deployed VMs to a Virtual Center environment, configuring VM storage devices (e.g., disk drives and/or data stores, etc.), and/or establishing VM security settings. Furthermore, a user may perform an application install operation, in which applications may be automatically or manually installed on one or more deployed VMs.

The VM function may enable a "go live" operation, in which a provisioned VM, with installed applications, may be powered up in the Virtual Center environment for use by a user of a client device. Furthermore, the VM function may enable the user to perform a bulk "go live" operation, in which multiple VMs may, by a single click of a button, be automatically and/or concurrently powered up, in which users may access the powered-up VMs in a Virtual Center environment. VMs subject to the "go live" operation (e.g., hereinafter referred to as "production VMs") may receive support services (e.g., maintenance and/or patching services, etc.) to control and/or maintain performance of the production VMs until decommissioned (e.g., powered down and/or otherwise removed from service).

Production VMs may be decommissioned when the services provided by the production VMs are no longer needed, are given a new host name, are powered off, and/or when network resources (e.g., central processing unit (CPU), random access memory (RAM), disk space, etc.) are reassigned. The VM function may enable the user to perform a bulk decommission operation in which multiple production VMs may, by a single click of a button, be automatically and/or concurrently powered down in the Virtual Center environment.

A VM may include many of the same characteristics as a physical machine, such as a unique operating system, processing resources, memory resources and/or storage capacity. For example, a VM may perform many of the same operations as a physical machine, such as receive input, run applications, perform computations, process and/or store information, communicate with other devices, and/or provide output. However, unlike a physical machine, a VM may not be directly tied to specific hardware and/or a single physical device (e.g., a network server, memory device, database, processor, etc.). For example, a particular VM may derive its characteristics and/or capability to perform operations from one or more physical devices that may be receiving instructions from another physical device that is independent from the particular VM. Additionally, or alternatively, a particular VM, executing a particular operating system (e.g., a guest operating system), may derive its characteristics and/or capability to perform operations from one or more physical machines that may be executing an independent operating system (e.g., a host operating system).

As described herein, therefore, one or more physical machines may support one or more VMs, in which each VM may execute a unique guest operating system and/or may perform operations, independent of the underlying physical machines, using processing resources (e.g., CPU quantity), memory resources (e.g., RAM size) and/or storage resources (e.g., data stores and/or disk space) allocated to each VM from one or more underlying physical devices.

FIG. 1 is a diagram of an overview of a VM function implementation described herein. As shown in FIG. 1, a client device (e.g., a computer, laptop, etc.) may store a VM function application in memory (e.g., memory associated with of the client device and/or database). The client device, using the VM function, may display a VM portal that may include one or more user interfaces (UIs) associated with one or more VM lifecycle operations (e.g., specification development, deployment, provisioning, and/or "go live," etc.). The user interfaces (UIs) may be accessible by a user of the client device and/or a development team associated with the network and/or the client device. The client device may be connected to a network that may include a physical machine (PM) environment (e.g., comprising one or more PMs and/or other network devices) and/or a storage area network (e.g., comprising one or more databases).

The VM function may enable some or all operations associated with the VM lifecycle to be performed automatically and/or concurrently. For example, as shown in FIG. 1, the VM lifecycle may include various states: assign, clone/deploy, provision, application install, go live/production and/or decommission, etc. It should be understood that the VM lifecycle may contain fewer, additional, different and/or differently arranged states than described herein.

The VM function may enable a user to perform specification development operations to create a VM in the "assign" state of the VM lifecycle (indication A). For example, during the assign state, the client device may receive VM information (e.g., requirements for a VM not yet in existence), from a user, via a specification user interface displayed on the client device. From the received VM information, the VM function may enable the user to derive specification information, which may include information for a particular VM not yet in existence, such as the VM detailed parameters (e.g., type of VM operating system, VM location within the network, VM physical storage location, VM internet protocol (IP) address information, etc.); information associated with VM CPU, RAM size, and/or disk details; information associated with customer maximum limits regarding CPU, RAM and/or disk details; VM maintenance schedule; and/or VM patching schedule. The VM function may create a VM in the assign state of the VM lifecycle and may store the specification information in the database. The user may repeat the specification development operation for the desired number of VMs to be deployed in the network.

The VM function may clone/deploy a VM in the assign state (indication B). During the "clone/deploy" state, the VM function may deploy the created VM into the Virtual Center environment and the VM function may change the state of the VM from the assign state to the "clone" state. For example, the VM function, via a data store user interface, displayed by the client device, may enable a user to associate a particular data store, from the storage area network, to a particular VM in the assign state.

The VM function may automatically deploy the VM with the associated data store, to the Virtual Center environment. When performing the deployment operation, the VM function may allocate processing and/or memory resources (e.g., CPU quantity and/or RAM size (GB), etc.) from the physical machine (PM) environment and may install the specified guest operating system. The VM function may partition storage resources (e.g., storage and/or disk space, etc.) from the storage area network. The VM function may monitor the deployment process and may automatically change the state of the VM from the clone state to the "deploy" state upon successful completion of the deployment operation. If the deployment operation is not successful, the VM function may return the VM back to the assign state.

The VM function may perform a bulk deployment operation, in which multiple VMs with associated data stores may be automatically and/or concurrently deployed to the Virtual Center environment.

The VM function may provision the deployed VM (indication C) and an application may be installed (indication D). For example, the user may initiate a provision operation and the VM function may change the VM state from the deploy state to the "provision" state of the VM lifecycle. The VM function may enable the user to configure and/or partition disk drives within the storage area network. Furthermore, the VM function may automatically establish, and/or enable the user to establish, security settings in accordance with network protocols and/or VM specification information. In another example, the VM function may provide handover messages, status reports, and/or notifications associated with VM lifecycle state changes and/or operations, of the deployed and/or provisioned VM, to users and/or the development team, and may automatically change the VM state from the provision state to "application install" state.

Applications may be installed on the provisioned VM. For example, the VM function may enable manual execution of application install operations by the user and/or development team and/or may automatically and/or concurrently execute application install operations for each VM. Furthermore, the VM function may enable manual testing operations to be performed by a user and/or the development team and/or may automatically perform testing operations to ensure that the application installation operation was performed successfully. The VM function may provide handover messages, status reports, and/or notifications associated with VM lifecycle state changes and/or application install operations to users and/or the development team. The VM function may automatically change the VM state from the application installation state to the "production" state.

The VM function may perform a go live operation (indication E). For example, in the production state, the VM function may perform a "go live" operation and may power up a particular provisioned VM, with successfully installed applications, to enable a user to access the powered-up production VM. The VM function may automatically provide alerts for periodic planned maintenance to the production VMs and may send software patches, application updates and/or operating system upgrades to the production VMs. In another implementation, the VM function may perform a bulk go live operation, in which multiple VMs may be automatically and/or concurrently powered-up in the VCE.

The VM function may decommission production VMs (indication F). For example, when a user no longer desires the services of a production VM, the VM function may automatically perform a "power down" operation, in which the name of the decommissioned VM may be changed, guest operating systems may be disabled, and/or network resources (e.g., CPU, RAM and/or storage/disk space, etc.) may be re-allocated to other network operations. In another example, the VM function may perform a bulk decommission operation, in which multiple production VMs may be automatically and/or concurrently powered down.

Figure 2:
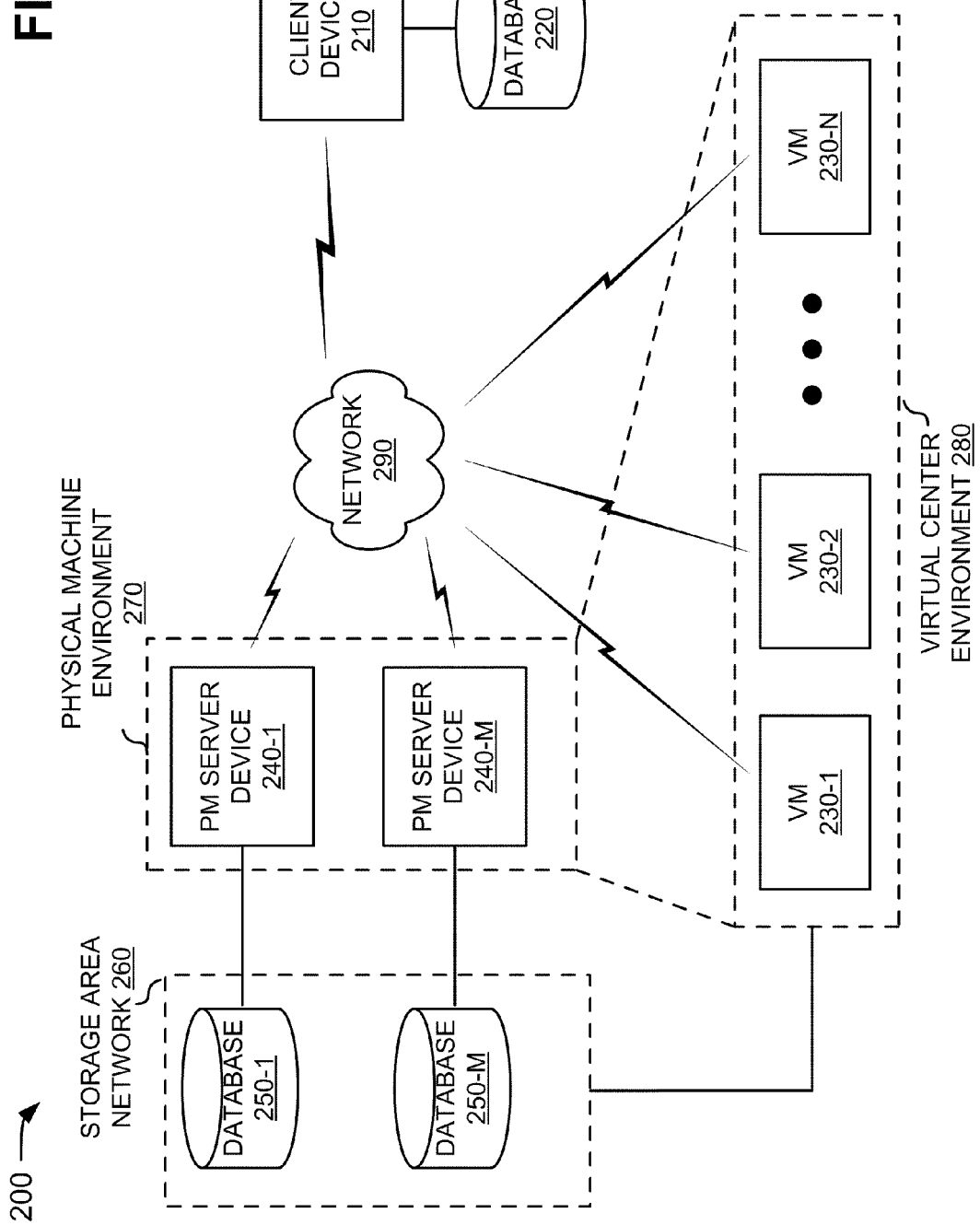
FIG. 2 is a block diagram of an exemplary network in which systems and/or methods described herein may be implemented.

FIG. 2 is a block diagram of an exemplary network 200, in which systems and/or methods described herein may be implemented. Network 200 may include a client device 210, a database 220, a group of VMs 230-1, 230-2, . . . , 230-N (where N≥1) (individually referred to as "VM 230" and collectively referred to as "VMs 230"), a group of physical machine (PM) server devices 240-1, . . . , 240-M (where M≥1) (individually referred to as "PM server device 240" and collectively referred to as "PM server devices 240"), a group of databases 250-1, . . . , 250-M (individually referred to as "database 250" and collectively referred to as "databases 250"), a storage area network 260, a physical machine (PM) environment 270, a Virtual Center environment 280, and a network 290. Components of network 200 may interconnect via wired connections, wireless connections, or a combination of wired and wireless connections.

A single client device 210, a single database 220, a group of VMs 230, a group of PM server devices 240, a group of databases 250, a single storage area network 260, a single PM environment 270, a single Virtual Center environment 280, and a single network 290 are illustrated in FIG. 2 for simplicity. In practice, there may be additional, fewer, different or differently arranged client devices 210, databases 220, VMs 230, PM server devices 240, databases 250, storage area networks 260, PM environments 270, Virtual Center environments 280 and/or networks 290. Also, in some implementations, one or more of the devices of network 200 may perform one or more functions described as being performed by another one or more of the devices of network 200. For example, client device 210, database 220, VMs 230, PM server devices 240, and/or databases 250, storage area network 260, PM environment 270 and/or Virtual Center environment 280 could be integrated into fewer devices or a single device that performs all or some of the functions described below as being performed by an individual one of these devices. In another example, client device 210 and PM server devices 240 could be integrated into a single device that performs all or some of the functions described below as being performed by an individual one of these devices.

Furthermore, as described herein, databases 250 and storage area network 260 may be integrated into a single device that performs all or some of the functions described below as being performed by an individual one of these devices. In another example, PM server devices 240 and PM environment 270 may be integrated into a single device that performs all or some of the functions described below as being performed by an individual one of these devices. In yet another example, VMs 230 and Virtual Center environment 280 may be integrated into a single virtual device that performs all or some of the functions described below as being performed by an individual one of these devices.

Client device 210 may include one or more user devices (e.g., a personal computer, a laptop, a wireless device, such as a mobile phone or a personal digital assistant (PDA), or the like), or other types of computation or communication devices, that gather, process, search, store, and/or provide information in a manner similar to that described herein. Client device 210 may interface with database 220, VM 230, PM server device 240, storage area network 260, PM environment 270 and/or Virtual Center environment 280. In one implementation, client device 210 may include logic and/or software associated with the VM function. For example, client device 210, using the VM function, may perform operations associated with the VM lifecycle (hereinafter referred to as "VM lifecycle operations"), such as specification development, deployment, provisioning, application install, "go live," decommissioning, bulk operations, search operations and/or data store associating, etc.

Client device 210, using the VM function, may present a VM portal, on the display of the client device, that includes one or more user interfaces (UIs) corresponding to various VM lifecycle operations. Client device 210 may authenticate users and/or development team members logging into the VM portal and/or one or more UIs associated with the VM portal. Client device 210 may receive information from a user, via one or more UIs, when performing VM lifecycle operations and may maintain a VM function database to store information associated with VM lifecycle operations in database 220.

Client device 210 may interface with PM environment 270 to execute a VM lifecycle operation. For example, client device 210 may communicate with PM environment 270 to execute a deployment operation in accordance with particular specifications associated with a particular VM 230. Client device 210 may communicate with PM environment 270 when performing other VM lifecycle operations, such as reconfiguring deployed VMs 230, performing "go live" operations and/or decommissioning operations, etc.

Client device 210 may interface with Virtual Center environment 280 to perform a VM lifecycle operation. For example, client device 210, using the VM function, may communicate with Virtual Center environment 280 to monitor Virtual Center environment 280 resource utilization (e.g., processor, memory and/or storage utilization) associated with one or more underlying VMs 230.

Database 220 may include a device that stores VM information associated with network 200. For example, database 220 may include VM specification information and/or data store information associated with VMs that exist within Virtual Center environment 280 and/or network 200. Furthermore, database 220 may store state information associated with the VM lifecycle (e.g., assign, clone/deploy, provision, application install, production and/or decommission state, etc.) for each VM 230 within network 200. Database 220 may receive information from Virtual Center environment 280 regarding resource usage (e.g., CPU, RAM, and/or storage/disk usage, etc.) for each VM 230 or group of VMs 230 within Virtual Center environment 280. Information, associated with a user of client device 210 and/or the development team, may be received and stored by database 220 and may be retrieved and sent to client device 210 to support authentication operations associated with the VM portal and/or one or more user interfaces associated with the VM portal.

VM 230 may be implemented within one or more server devices, or other types of computation or communication devices, that gather, process, search, store, and/or provide information in a manner similar to that described herein. VM 230 may be a "virtual" device in the sense that each VM 230 may exist as software that presents an interface for one or more underlying computing devices. VM 230 may interface with client device 210, PM server devices 240, databases 250, storage area network 270, PM environment 270 and/or Virtual Center environment 280. In one implementation, VM 230 may include a unique operating system (e.g., a guest operating system), which may run in parallel on one or more PM server devices 240 running a different operating system (e.g., a host operating system), potentially presenting interfaces for different virtual hardware devices that may gather, process, search, store, and/or provide information in a manner similar to that described herein.

In another implementation, VM 230 may interface with PM environment 270 and/or storage area network 260 to obtain processing resources (e.g., CPU and/or RAM capacity) and/or to receive storage resources (e.g., disk and/or storage space), respectively, to support VM 230 operations. For example, VM 230 may interface with PM environment 270 to run an application for a user of client device 210 or to perform a VM lifecycle operation when requested by client device 210. Furthermore, VM 230 may send information to storage area network 260 and/or may retrieve information from storage area network 260 to support an operation being performed by VM 230.

PM server 240 may include one or more server devices, or other types of computation or communication devices, that gather, process, search, store, and/or provide information in a manner similar to that described herein. PM server device 240 may interface with client device 210, VMs 230, database 250, storage area network 260, PM environment 270, and/or Virtual Center environment 280, via network 290. PM server 240 may include a host operating system and may perform VM lifecycle operations (e.g., deployment, provisioning, application install, go-live, and/or decommissioning, etc.), when requested by client server 210. In one implementation, PM server device 240 may provide processing and/or memory resources to VM 230 and/or Virtual Center environment 280. Furthermore, PM server device 240 may direct databases 250 and/or storage area network 260 to allocate storage resources for VM 230.

Database 250 may include one or more devices that store information and/or data. Database 250 may interface with VM 230, PM server device 240, storage area network 260 and/or Virtual Center environment 280. Database 250 may store a host operating system, applications and/or data for PM server device 240. Database 250 may provide storage resources (e.g., data stores) for a deployed VM 230 and may store guest operating systems, applications and/or data for a deployed VM 230. Database 250 may allocate data storage resources to storage area network 260 for use by Virtual Center environment 280 and/or PM environment 270. Database 250 may store information and/or data associated with the performance of VM lifecycle operations by PM server device 240 and/or may receive instructions from corresponding PM server device 240.

Storage area network 260 may include one or more storage devices, such as databases 250. Storage area network 260 may exist as part of the VM function that presents an interface for one or more underlying database devices (e.g., databases 250). Storage area network 260 may interface with client device 210, VMs 230, databases 250, PM environment 270 and/or Virtual Center environment 280. In one implementation, storage area network 260 may be dynamically provisioned as a single cumulative pool of storage (e.g., sometimes referred to as "virtual storage") that leverages available storage resources from databases 250. Storage area network 260 may dynamically provide and/or re-allocate storage resources, provided by databases 250, in response to requests from Virtual Center environment 280, PM environment 270 and/or client device 210 during VM lifecycle operations. Storage area network 260 may be monitored by client device 210 to ensure adequate total available storage and/or database resources are provided to Virtual Center environment 280 and/or underlying VMs 230.

PM environment 270 may include one or more server devices, such as PM server devices 240. PM environment 270 may exist as part of the VM function that presents an interface for one or more underlying server devices (e.g., PM server devices 240). PM environment 270 may interface with client device 210, VMs 230, PM server devices 240, storage area network 260 and/or Virtual Center environment 280. In one implementation, PM environment 270 may be provisioned (e.g., by client device 210, VM 230, and/or Virtual Center 280) as a single, cumulative pool of processing and/or memory resources leveraged from available CPU and/or RAM capacity from underlying PM server devices 240. PM environment 270 may dynamically provide and/or re-allocate processing and/or memory resources, from underlying PM server devices 240, in response to requests from Virtual Center environment 280, VMs 230 and/or client device 210 during VM lifecycle operations. PM environment 270 may be monitored by client device 210 (e.g., via the VM function) to ensure adequate total processing and memory resources are provided to Virtual Center environment 280 and/or underlying VMs 230.

Virtual center environment 280 may include one or more virtual devices, such as VMs 230. Virtual center environment 280 may exist as part of the VM function that presents an interface for one or more underlying virtual devices (e.g., VMs 230). Virtual center environment 280 may interface with client device 210, VMs 230, storage area network 260 and/or PM environment 270. In one implementation, Virtual Center environment 280 may be provisioned (e.g., by client device 210 and/or PM environment 270) as a single server device and/or cluster of server devices (e.g., with a variety of operating systems, applications and/or services, etc.) that provides pooled processing, memory and/or storage services and/or resources received from underlying VMs 230. The utilization of storage, processing and/or memory resources, by Virtual Center environment 280, may be monitored by client device 210 (e.g., via the VM function) and balanced against resources and/or services received from storage area network 260 and/or PM environment 270.

Network 290 may include a local area network (LAN), a wide area network (WAN), a metropolitan area network (MAN), a telephone network (e.g., the Public Switched Telephone Network (PSTN), or a cellular network, such as the Public Land Mobile Network (PLMN)), an intranet, the Internet, a fiber optic-based network, or a combination of networks.

Figure 3:
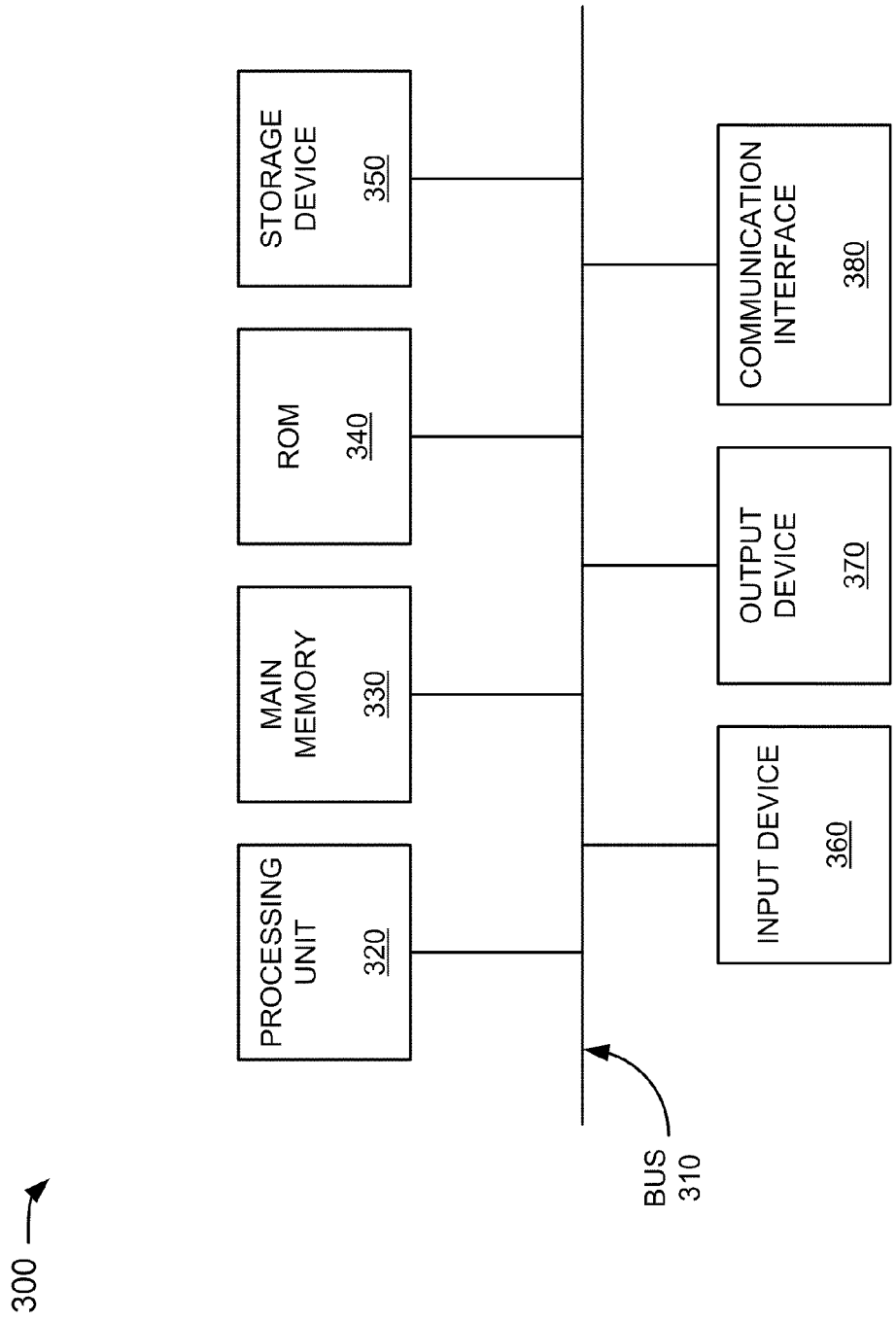
FIG. 3 is a diagram of exemplary components of one or more of the devices of FIG. 2.

FIG. 3 is a diagram of an exemplary device 300 that may correspond to one or more devices in network 200, such as client device 210 and/or PM server devices 240. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include a processor, a microprocessor, an application-specific integrated circuit (ASIC), a field programmable gate array (FPGA), or another type of processing unit that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive, or a type of flash memory.

Input device 360 may include a mechanism that permits an operator to input information into device 300, such as a keyboard, a mouse, a pen, a button, voice recognition and/or biometric mechanisms, a touch screen, etc. Output device 370 may include a mechanism that outputs information to the operator, such as a display, a speaker, a light emitting diode (LED), etc. Communication interface 380 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 380 may include mechanisms for communicating with another device or system via a network, such as network 290.

As described herein, device 300 may perform certain operations in response to processing unit 320 executing software instructions contained in a computer-readable medium, such as main memory 330. A computer-readable medium may be defined as a physical or logical memory device. A logical memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, additional, different, or differently arranged components than depicted in FIG. 3. In still other implementations, one or more components of device 300 may perform one or more tasks described as being performed by one or more other components of device 300.

FIG. 4 is a diagram of an exemplary VM specification user interface 400 capable of being presented on client device 210. VM specification user interface (hereinafter referred to as "specification user interface") 400, shown in FIG. 4, may correspond to a graphical user interface or a non-graphical user interface. Specification user interface 400 may provide information to the user via a customized interface (e.g., proprietary interface) and/or other types of interfaces (e.g., browser-based interfaces, television interfaces, etc.). Specification user interface 400 may receive user inputs via one or more input devices (e.g., input device 360, of FIG. 3), and/or may be user-configurable (e.g., a user may change the size of the user interface, information displayed in the user interface, color schemes used by the user interface, positions of text, images, icons, windows, etc., in the user interface, etc.). Specification user interface 400 may be displayed to the user via an output device (e.g., output device 370, of FIG. 3).

As illustrated in FIG. 4, specification user interface 400, and specification user interface data items 405-440, may enable a user (e.g., a user of client device 210) to add, edit and/or delete specification information associated with a particular VM 230 in the assign state and/or other VM lifecycle states. Specification user interface 400, as shown in FIG. 4, may include "VM Details" 405, "VM Resource Details" 410, "VM Resource Limits" 415, "VM maintenance schedule" 420, "VM Patching Schedule" 425, "Save" button, 430, "Save & Repeat" button 435 and/or "Clear" button 440.

In one implementation, specification user interface 400 may include VM Details 405 that may enable a user of client device 210 to provide location information, project information, and/or guest information during a specification development operation, in which the VM function may create a VM 230 in the assign state of the VM lifecycle. For example, a user may specify "location information" (e.g., location within network 200, of FIG. 2) pertaining to VM 230 to be created, which may include a hostnames (e.g., "fiddtest03v") associated with PM server device 240 on which VM 230 may be based; a physical data center (e.g., "fairland") associated with database 250, in which VM 230 may be stored; a Virtual Center (e.g., "fldplsyscs03.v.com(B)") associated with the location within Virtual Center environment 280, in which VM 230 may be located; a logical data center (e.g., "non-prod—ehnet") associated with the location within storage area network 280 (e.g., virtual storage location) from which VM 230 may receive storage resources (e.g., data stores); and/or a domain/environment (e.g., "ehnet") associated with the location within PM environment 270 from which VM 230 may receive processor and/or memory resources.

In another example, a user (e.g., a user of client device 210) may specify "project information" associated with VM 230 in the assign state, which may include the project name (e.g., "vmtest") pertaining to the creation of one or more VMs 230; information regarding the build engineer (e.g., "j. smith") pertaining to the user responsible for specifying and/or performing other VM lifecycle functions regarding VM 230; and/or comments pertaining to special instructions, caveats and/or notations associated with the specifications for, deployment of, and/or other matters pertinent to VM 230.

In yet another example, a user may specify "guest information," which pertains to the guest operating system to be used by VM 230, network address information (e.g., IP address, subnetmask, and/or gateway information, etc.) associated with VM 230 within network 200 (FIG. 2) and/or particular applications to be installed for use by VM 230, once deployed.

Also, or alternatively, specification user interface 400 may include VM Resource Details 410 that may enable a user to provide resource information, such as processing capacity (e.g., CPU quantity), memory resources (e.g., RAM size) and/or storage resources (e.g., disk quantity and/or size), during a specification development operation in which the VM function may create a VM 230 in the assign state of the VM lifecycle. For example, a user may specify CPU quantity (e.g., "1") to be received from PM environment 270; RAM size (e.g., in gigabytes (GB)) (e.g., "1") that may received from PM environment 270; and/or disk1 size (GB) (e.g., "2"), disk2 size (GB) (e.g., "2"), and/or disk3 size (GB) (e.g., "2"), that may be utilized, from storage area network 260, by VM 230.

Also, or alternatively, specification user interface 400 may provide VM Resource Limits 415 that may enable a user (e.g., of client device 210) to provide maximum permissible resource limits associated with a user's processor, memory and/or storage resources during a specification development operation, in which the VM function may create a VM 230 in the assign state of the VM lifecycle. For example, a user may specify CPU quantity (e.g., "2") that may be utilized, from PM environment 270, associated with VM 230; RAM size in gigabytes (GB) (e.g., "2") that may be utilized, from PM environment 270, by VM 230; and/or disk1 size (GB) (e.g., "15") and/or disk2 size (GB) (e.g., "3") that may be utilized, from storage area network 260, by VM 230. It should be understood that quantities pertaining to CPU quantity, RAM and/or disk sizes (e.g., disk1 and/or disk2, etc.) in VM resource details field 410, may not exceed the quantities specified by VM resource limits 415.

Also, or alternatively, specification user interface 400 may include VM Maintenance Schedule 420 and/or VM Patching Schedule, 425 that may enable a user (e.g., a user of client device 210) to specify scheduled recurring maintenance events and/or patching events, respectively, for the particular VM 230 in the production state of the VM lifecycle. For example, VM maintenance schedule 420 and/or VM patching schedule 425 may be specified in terms of recurring frequency (e.g., daily, weekly, monthly, and/or yearly, etc.), starting at a specified month, week, day, and/or at a particular time of day (e.g., in hours and/or minutes ("HH:MM")). The user may also specify the duration of a specified maintenance and/or a specified patching event (e.g., in hours and/or minutes ("HH:MM")).

The user may save the specification information associated with the particular VM 230 by selecting the "Save" button 430. Furthermore, the user may save the specification information for the particular VM 230 and may continue to perform a specification development operation for additional VMs 230 by selecting the "Save & Repeat" button 435. The user may clear the contents of the specification user interface 400 by selecting the "Clear" button 440.

Although specification user interface 400 and data items 405-440 provide a variety of information, in other implementations, specification user interface 400 and data elements 405-440 may depict fewer, additional, different, or differently arranged information than shown in FIG. 4. Furthermore, although certain features associated VM specification information have been described above in connection with FIG. 4, in other implementations, fewer, additional, different, or differently arranged features, than described above in connection with FIG. 4 may be associated with VM specification information.

Figure 5:
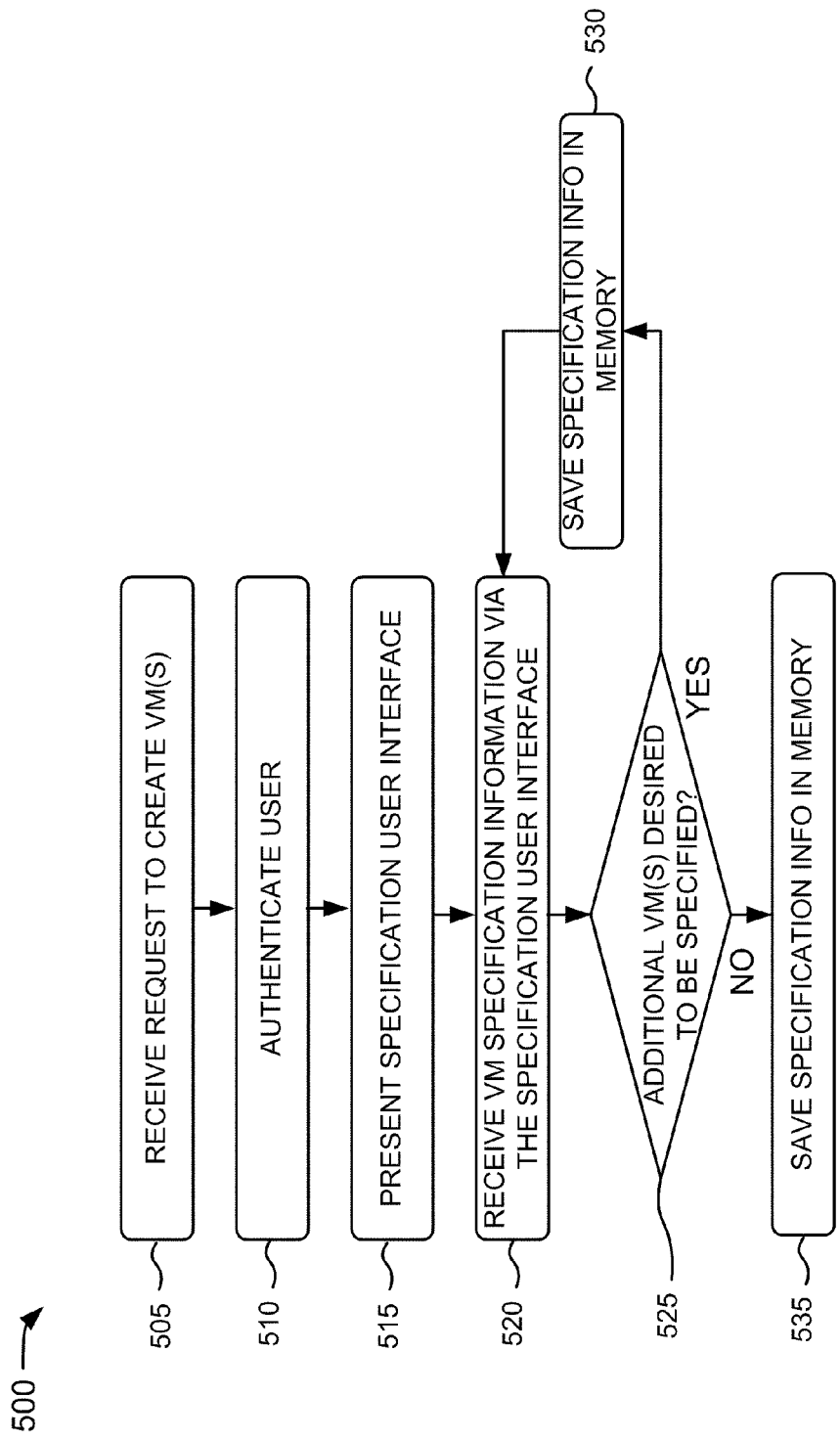
FIG. 5 is a flowchart of an exemplary process for performing a virtual machine specification development operation prior to deployment.

FIG. 5 is a flowchart of an exemplary process 500 for performing a virtual machine specification development operation prior to deployment. In one implementation, some or all of process 500 may be performed by client device 210 with database 220. In another implementation, some or all of process 500 may be performed by one or more devices separate from or in combination with client device 210.

Process 500, of FIG. 5, may include receiving a request to create a VM 230 (block 505) and authenticating the user (block 510). For example, a request to create VM 230 may be received from a user (e.g., a user of client device 210) when the user logs into the VM function, via the VM Portal login user interface presented on the display of client device 210. Client device 210 may receive information associated with the user (e.g., username, password, and/or PIN, etc.) and may retrieve information associated with the user from database 220. Client device 210 may compare the received information associated with the user and the information associated with the user retrieved from database 220. Client device 210 may authenticate the user if the received information, associated with the user, matches the information, associated with the user, retrieved from database 220.

A specification user interface may be presented (block 515) and VM specification information may be received from the specification user interface (block 520). For example, a user may request, via the VM portal, to perform a specification development operation. Client device 210 may receive the request and may retrieve information associated with a specification user interface (e.g., data items 405-440 associated with specification user interface 400 of FIG. 4) from database 220 and may present specification user interface 400 on the display (e.g., device 370 of FIG. 3) of client device 210.

Client device 210 may receive specification information, from the user, via the specification user interface. The specification information may include VM details (e.g., location information, project information and/or guest information, etc.); VM resource details (e.g., CPU quantity, RAM allocation, and/or disk space, etc.); VM resource limits (e.g., maximum CPU quantity, maximum RAM allocation, and/or maximum disk space, etc.); VM maintenance schedules; and/or VM patching schedules.

If additional VMs 230 are desired to be specified (block 525—YES), then specification information may be saved in memory (block 530) and specification information may be received from the specification user interface (block 520). For example, client device 210 may receive a save and repeat request when the user selects a particular button in the specification user interface (e.g., "Save & Repeat" 435, of FIG. 4). Client device 210 may, via the VM function, create a particular VM 230, based on the specification information received from the user, and may set the particular VM 230 to the "assign" state of the VM lifecycle. Furthermore, client device 210 may store, in database 220, the VM lifecycle state information and/or specification information associated with the particular VM 230. Client device 210 may receive specification information, associated with another VM 230, via the specification user interface, until all of the desired VMs 230 are created.

If additional VMs 230 are not desired to be specified (block 525—NO), then specification information may be saved (block 535). For example, client device 210 may receive a request to save the specification information when the user selects a particular button in the specification user interface (e.g., "Save" 430, of FIG. 4). Client device 210 may, via the VM function, create a particular VM 230, based on the specification information received from the user, and may set the particular VM 230 to the assign state of the VM lifecycle. Client device 210 may store, in database 220, the VM lifecycle state information and specification information associated with the particular VM 230.

Figure 6B:
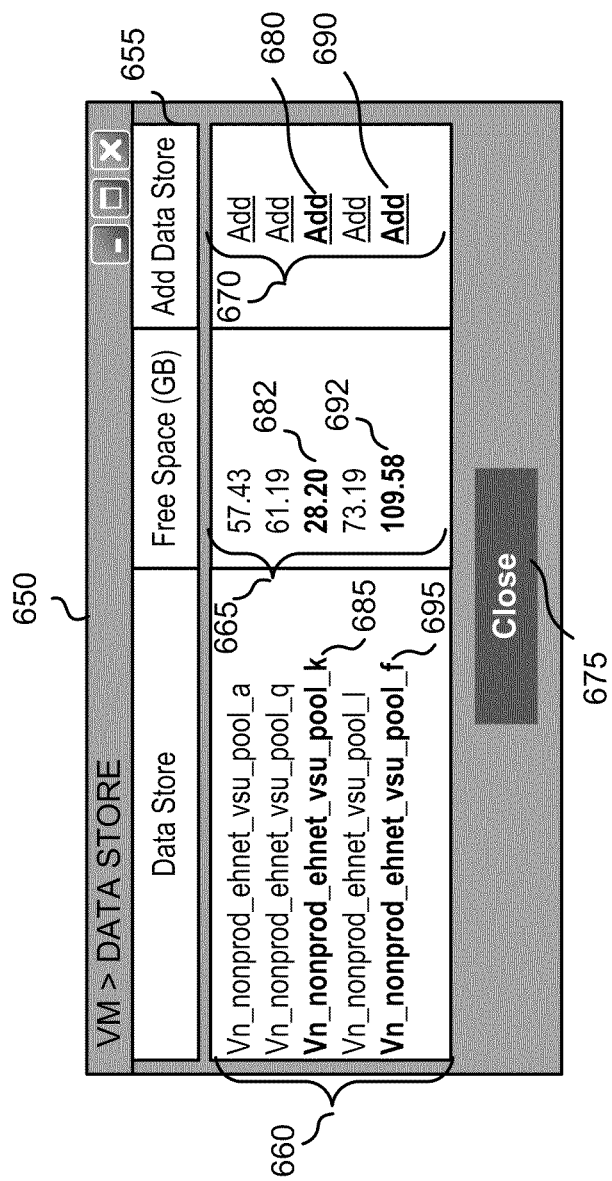
FIG. 6B is a diagram of an exemplary virtual machine data store user interface capable of being presented by the client device of FIG. 2.

FIGS. 6A and 6B are diagrams of exemplary VM user interfaces 600 and 650, respectively, capable of being presented by client device 210. VM listing user interface 600, as shown in FIG. 6A, and VM data store user interface 650 (hereinafter referred to as "data store user interface"), as shown in FIG. 6B, may correspond to graphical user interfaces or non-graphical user interfaces.

VM listing user interface 600 and/or data store user interface 650 may provide information to the user via a customized interface (e.g., proprietary interface) and/or other types of interfaces (e.g., browser-based interfaces, television interfaces, etc.). VM listing user interface 600 and/or data store user interface 650 may receive user inputs via one or more input devices (e.g., input device 360), and/or may be user-configurable (e.g., a user may change the size of the user interface, information displayed in the user interface, color schemes used by the user interface, positions of text, images, icons, windows, etc., in the user interface, etc.). VM listing user interface 600 and/or data store user interface 650 may be displayed to the user via an output device (e.g., output device 370).

As illustrated in FIG. 6A, VM listing user interface 600, and data items 605 through 640-5, may enable a user (e.g., a user of client device 210) to select one or more VMs 230, in the assign state of the VM lifecycle, to perform a particular VM lifecycle operation (e.g., data store association, specification editing, deployment, "go live" and/or decommission, etc.).

In one implementation, VM listing user interface 600 may include data items 605, which describe one or more VMs 230, such as VM 230 "Hostname" (e.g., associated with PM environment 270 running the host operating system), "Physical DC" (e.g., indicator of physical data cluster associated with storage area network 260,), "project name" (e.g., the project name associated with VM 230 deployment), "IP address" (e.g., the IP address VM 230 may assume once deployed in Virtual Center environment 280)," "Op. Sys." (e.g., identifier of VM 230 guest operating system), "status" (e.g., information identifying a VM lifecycle state), "data store" (e.g., information identifying the data store associated with a particular VM 230), "Select VM" (e.g., enables a user to select a particular VM 230 for a VM lifecycle operation), "Edit" (e.g., enables the user to return to the specification user interface to edit specification information corresponding to a particular VM 230), "delete" (e.g., enables a user to initiate a deletion operation with respect to a particular VM 230), and/or "Add Data Store" (e.g., enables a user to initiate a data store association operation).

For example, assume four VMs 230 are specified by a user (e.g., a user of client device 210) and saved, by client device 210, to database 220. Assume further that the user wishes to associate data stores with one or more particular VMs 230 prior to performing a VM deployment operation. In this example, VM listing user interface 600 may show four VMs 230 in the assign state with parameters specified during the specification development process (e.g., process 500 of FIG. 5), such as VM 230 with a hostname "fiddtest01v" 610, VM 230 with a hostname "fiddtest02v" 615, VM 230 with a hostname "fiddtest03v" 620 and/or VM 230 with a hostname "fiddtest04v" 625.

Assume further that the user wishes to add a data store to a particular VM 230, listed in VM listing user interface 600, that may be specified to run a particular type of guest operating system (e.g., MS Windows Server 2003, Std. Ed. (64-bit)). The user may select a particular button in VM listing user interface 600 (e.g., "Add" 630) corresponding with the first VM 230 (e.g., VM 230 with hostname "fiddtest03v" 620) with a particular operating system (e.g., MS Windows Server 2003, Std. Ed. (64-bit)) as indicated by "Op. Sys." Selecting the "Add" button 630 may cause client device 210, using the VM function, to present a data store user interface that may enable the user to associate a particular data store to the particular VM 230 (e.g., "fiddtest03v"). The user may repeat the process for other VMs 230 listed in VM listing user interface 600 (e.g., VM 230 with hostname "fiddtest04v" 625) that were specified to run the particular guest operating system.

In yet another example, assume the user wishes to deploy particular VMs 230, listed in VM listing user interface 600, that have data stores associated with particular VMs 230. For example, within "Select VM," the user may select the box 635 (e.g., by selecting with a mouse or otherwise making an "X" appear in the box) corresponding to VMs 230 (e.g., fiddtest03v and fiddtest04v) with data stores associated with them (e.g., data store "Vn_nonprod ehnet_vsu_pool_k" associated with fiddtest03v and/or "Vn_nonprod ehnet_vsu_pool_f" associated with fiddtest04v). Rather than deploy each VM 230, with an associated data store, one at a time via a series of separate deployment operations, the VM function may enable the user to select the "Deploy Windows VM(s)" button 640-1 to automatically and/or concurrently deploy the selected VMs 230 to Virtual Center environment 280.

As illustrated in FIG. 6B, data store user interface 650, and data items 655-695, may enable a user (e.g., a user of client device 210) to associate a data store (i.e., storage area within storage area network 260 and/or database 250), in which a particular VM 230, in the assign state, may be stored when the particular VM 230 is deployed. Data store user interface 605, as shown in FIG. 6B, may include data items 655 (e.g., data store name, data store free space (GB) and/or add data store field, etc.), a list of data store names associated with a particular selected VM 230 660, a list of data store free space values corresponding with each data store name 665, a number of "add" buttons 670 corresponding with each data store name and free space value, and/or a "close" button 675 that enables a user to close data store user interface 650 after a particular data store is associated with a particular VM 230.

In one implementation, data store user interface 650 may include data item 655, which may provide "Data stores" (e.g., data storage bins within storage area network 260 that may be potentially allocable to one or more selected VMs 230), "Free Space (GB)" (e.g., the size of the storage bin corresponding to each listed data store) and/or "Add Data Store" (e.g., associates a particular data store with a selected VM 230). In one example, in a manner similar to that described above (e.g., in FIG. 6A), the user may select a particular VM 230 (e.g., fiddtest03v), which may cause data store user interface 650 to be presented on the display of client device 210. The user may desire to associate a data store with a particular VM 230 (e.g., fiddtest03v) that may be specified to run using a particular operating system (e.g., MS Windows Server 2003, Std. Ed. (64-bit)). The user may select the "add" data item 680, which may cause the VM function to associate a particular data store (e.g., "vn_nonprod_ehnet_vsu_pool_k" 685) with a corresponding free space (e.g., 28.20 GB 682) to the particular VM 230 (e.g., fiddtest03v). The user may desire to repeat the process for one or more VMs 230 (e.g., fiddtest04v) and may select the "add" data item 690, which may cause the VM function to associate a particular data store (e.g., "vn_nonprod_ehnet_vsu_pool_f" 695) with a corresponding free space (e.g., 109.58 GB 692) to the particular VM 230 (fiddtest04v). The user may select the "Close" button 675 when the desired data stores are associated and/or when the data store association process is complete.

Although VM listing user interface 600, with associated data items 605 through 640-5 (FIG. 6A), and data store user interface 650, with associated data items 655-695 (FIG. 6B), may illustrate a variety of information, in other implementations, VM listing user interface 600, with associated data items 605 through 640-5, and data store user interface 650, with associated data items 655-695, may depict fewer, additional, different, or differently arranged information than depicted in FIG. 6A and FIG. 6B, respectively. Furthermore, although certain features associated with particular VM functions (e.g., VM deployment and/or data store association) have been described above in connection with FIGS. 6A and 6B, in other implementations, fewer, additional, different, or differently arranged features, than described above in connection with FIGS. 6A and 6B may be associated with particular VM functions (e.g., VM deployment and/or data store association).

FIG. 7 is a flowchart of an exemplary process 700 for automated virtual machine deployment. In one implementation, some or all of process 700 may be performed by client device 210 interfacing with database 220, with VMs 230, storage area network 260, PM environment 270 and/or virtual environment 280. In another implementation, some or all of process 700 may be performed by one or more devices separate from or in combination with client device 210. Process 700 will be discussed below with references to data items 605 through 640-5 associated with VM listing user interface 600 of FIG. 6A, and data items 655-695 associated with data store user interface 650 of FIG. 6B.

Process 700, of FIG. 7, may include receiving a request to prepare a VM 230 for deployment (block 705) and a VM listing user interface may be presented (block 710). For example, client device 210, may receive a request from a user (e.g., a user of client device 210), via the VM portal, to prepare VMs 230, in the assign state of the VM lifecycle, for deployment to Virtual Center environment 280. Client device 210, may receive the request to prepare VMs 230 for deployment and may retrieve information associated with a VM listing user interface (e.g., data items 605-640 associated with VM listing user interface 600 of FIG. 6A) from database 220. Client device 210 may present the VM listing user interface on the display (e.g., device 370 of FIG. 3) of client device 210.

A request to view data store information may be received via the VM listing user interface (block 715). For example, the user may request to view data store information associated with a particular VM 230 (e.g., VM 230 with a hostname, "fiddtest03v" 620, of FIG. 6A) by selecting a particular button in the VM listing user interface (e.g., by selecting on the "add" button 630 in the VM listing user interface 600 of FIG. 6A).

Data store information may be retrieved (block 720) and a data store user interface may be presented (block 725). For example, client device 210 may receive the request to view data store information associated with the selected VM 230 and may, via the VM function, retrieve data store information from storage area network 260. The data store information may include information associated with available disk space within storage area network 260 (e.g., data store names, data store locations within storage area network 260, and/or available data store free space (GB), etc.). Additionally, and/or alternatively, client device 210 may retrieve, from database 220, information associated with a data store user interface (e.g., data items 655-670 associated with data store user interface 650 of FIG. 6B). Client device 210 may present the data store information, and information associated with the data store user interface, on the display (e.g., display 370, of FIG. 3) of client device 210.

A request to associate a particular data store with a selected VM 230 may be received (block 730) and the particular data store may be associated with the selected VM 230, via the data store user interface. For example, the user (e.g., the user of client device 210) may desire to associate a data store with the selected VM 230 (e.g., VM 230 with hostname, "fiddtest03v"). The user may request that a particular data store be associated with the selected VM 230 by selecting a particular button in the data store user interface (e.g., by selecting on "add" 660 associated with data store user interface 650 of FIG. 6B) corresponding with the particular desired data store (e.g., "vn_nonprod_ehnet_vsu_pool_k") and/or free space (e.g., 28.20 GB). Client device 210 may receive the request to associate the particular data store with the selected VM 230 and may cause the VM function to associate the particular data store and/or corresponding free space with the selected VM 230. Client device 210, via the VM function, may direct storage area network 260 to partition and/or allocate the particular data store and free space for the selected VM 230.

Care may be taken by the user to select a data store with enough free disk space (GB). For example, the user may associate a data store with free space that may be approximately equal to or greater than the maximum disk capacity of the selected VM 230 when deployed in Virtual Center environment 280, as may be specified by the VM resource limits (e.g., VM Resource Limits 415, of FIG. 4) during specification process 500 (FIG. 5).

If additional data stores are desired to be associated (block 740—YES), then a request to view data store information, via the VM listing user interface, may be received (block 715). For example, the user may desire to prepare additional VMs 230 for deployment into Virtual Center environment 280 and, in a manner similar to that discussed above (at blocks 715-725), the user may request to view data store information associated with another particular VM 230 (e.g., VM 230 with a hostname, "fiddtest04v"). Client device 210 may receive the request and may present data store information associated with the selected VM 230 within the data store user interface on the display of client device 210. In manner similar to that described above (at blocks 730-735), the user may request that a particular data store (e.g., Vn_nonprod ehnet_v-su_pool_f), with a particular free space (e.g., 109.58 GB), be associated with the selected VM 230 and client device 210 may direct, via the VM function, storage area network 260 to partition and/or allocate the particular data store and free space for the selected VM 230. The user may request that the VM function continue to prepare additional VMs 230 for deployment by associating additional data stores with the additional VMs 230.

If additional data stores are not desired to be associated (block 745—NO), then a request to perform a deployment operation may be received, via the VM listing user interface (block 750). For example, the user may wish to deploy a VM 230 to Virtual Center environment 280 and may, with a single click of a particular deploy button (e.g., "Deploy Windows VM(s)," 640, of FIG. 6A) within the VM listing user interface, cause client device 210, via the VM function, to automatically deploy the selected VM 230 to the Virtual Center environment 280.

In another example, the user may wish to perform a bulk deployment operation on a number of VMs 230 with associated data stores. The user may select the VMs 230 (e.g., fiddtest03v, fiddtest04v, and/or other selected VMs 230, etc.) that may be deployed (e.g., by selecting on the "select VM" box 630 corresponding to the desired VMs 230) to Virtual Center environment 280. Furthermore, the user may, with a single click of a button (e.g., "Deploy Windows VM(s)," 640, of FIG. 6A) within the VM listing user interface, cause client device 210, via the VM function, to automatically and/or concurrently perform a bulk deployment of the multiple VMs 230 to the Virtual Center environment 280.

In another example, client device 210, via the VM function, may automatically and/or concurrently deploy one or more VMs 230 with guest operating systems that may not be windows-based operating systems. For example, client device 210, via the VM function, may automatically and/or concurrently deploy one or more VMs 230 that use non-Windows-based guest operating systems (e.g., Sun Solaris 10, RH Enterprise Linux 5, etc.) when the user selects another deployment button (e.g., "Deploy Non-Windows VM(s)," 640, of FIG. 6A).

In yet another implementation, client device 210, via the VM function, may automatically and/or concurrently deploy VMs 230 with different types of operating systems (e.g., both Windows-based and non-Windows-based guest operating systems).

The state of VMs 230 may be changed from the assign state to the clone state and editing and/or deleting functions may be disabled (block 750). For example, client device 210, via the VM function, may monitor the deployment process and may change the state of the VMs 230 undergoing deployment, from the assign state to the clone state of the VM lifecycle. Client device 210 may direct PM environment 270 to install each VM 230 (e.g., VMs 230 undergoing deployment), with the specified guest operating system (e.g., MS Windows Server 2003) into each associated data store, partitioned within storage area network 260 in accordance with the specification information. Furthermore, client device 210 may direct PM environment 270 to allocate particular processing and/or memory capacity (e.g., CPU quantity and/or RAM, respectively) in accordance with the specified VM resource details and/or VM resource limits for each deployed VM 230. Client device 210, via the VM function, may disable certain VM operations associated with a user's ability to edit and/or delete specification information and/or data store information corresponding to VMs 230 undergoing deployment.

If the deployment operation is successful (block 755—YES), then VMs 230 may be changed to the deploy state and editing and/or deleting operations may be enabled (block 760). For example, client device, via the VM function, may monitor the deployment process. If the VM function determines that the deployment operation was successful, then client device 210 may change the state of VMs 230 from the clone state to the deploy state. The VM function may determine that the deployment operation was success if the data stores associated with each VM 230 are successfully partitioned by storage area network 260; the processing and/or memory resources for each clone VM 230 are successfully allocated by PM environment 270; and/or the specified guest operating system is successfully installed in the storage area network 260 by PM environment 270. Furthermore, client device 210, via the VM function, may enable certain VM operations associated with a user's ability to edit and/or delete specification information and/or data store information corresponding to deployed VMs 230.

If the deployment operation is not successful (block 755—NO), then VMs 230 may be returned to the assign state (block 765). For example, if client device 210, via the VM function, determines that one or more data stores are not properly partitioned, that one or more processing and/or memory resources are not properly allocated, and/or that one or more guest operating systems are not properly installed, then the VM function may return clone VMs 230 to the assign state, where VM troubleshooting operations may be performed by a user and/or the development team.

FIG. 8 is a flow chart of an exemplary process 800 for performing additional virtual machine deployment lifecycle operations. In one implementation, some or all of process 800 may be performed by client device 210 interfacing with database 220, with VM 230, storage area network 260, PM environment 270, and/or Virtual Center environment 280. In another implementation, some or all of process 800 may be performed by one or more devices separate from or in combination with client device 210. Process 800 will be discussed below with references to data items associated with VM update user interface 900 of FIG. 9.

Process 800, of FIG. 8, may include receiving a request to provision deployed VM 230 (block 805). For example, client device 210, may receive a request from a user (e.g., a user of client device 210), via the VM portal, to perform a provisioning operation on a deployed VM 230. Client device 210 may receive the request and may retrieve, from database 220, specification information associated with a particular deployed VM 230. Client device may also retrieve information associated with a VM update user interface (e.g., data items 910-920 associated with VM update user interface 900 of FIG. 9) from database 220. Client device 210 may present the specification information and the information associated with the VM listing user interface on the display (e.g., device 370 of FIG. 3) of client device 210. Client device 210 may, via the VM function, change deployed VM 230 from the deploy state to the provision state of the VM lifecycle.

An update operation and/or provision operation may be performed (block 810). In one implementation, a user may desire to update particular specification information, pertaining to a deployed VM 230 in the provision state of the VM lifecycle, to prepare the particular VM 230 for other VM lifecycle operations, such as application install operations, "go live" operations, etc.) For example, a user may request to perform an update operation on a particular deployed VM 230 by modifying the specification information in the VM update user interface (e.g., the specification information 910 of VM update user interface 900 of FIG. 9).

In one example, the user may change particular project information, such as project name, build engineer and/or comments followed by selecting the save button on the VM update user interface (e.g., by selecting on the "save" button 920 within VM update user interface 900 of FIG. 9). Client server 210 may receive the save request and may update the specification information associated with the particular deployed VM 230 stored in database 220. In another example, the user may update the VM resource details (e.g., CPU quantity, RAM size and/or disk size, etc.), VM resource limits (e.g., CPU quantity, RAM size and/or disk size, etc.), maintenance schedules and/or patching schedules associated with the particular deployed VM 230 followed by selecting the configuration/reconfiguration button (e.g., "Config/Reconfig" button 925 of VM update user interface 900 of FIG. 9). Client device 210 may receive the reconfiguration request and may direct storage area network 260 to reconfigure storage associated with the particular VM 230 in accordance with the reconfiguration request. Client device 210 may also direct PM environment 270 to reconfigure processing and/or memory resources associated the particular deployed VM 230. Client device 210 may also direct the VM function to perform a power recycle operation to initiate or conclude the configuration operation.

It should be understood that the user may not change particular VM details (e.g., VM details 910 associated with VM update user interface 900 of FIG. 9), such as location information and/or guest information, unless and/or until the particular deployed VM 230 is returned to the assigned state.

In other implementations, the update operation may be performed when the particular VM 230 is in other VM lifecycle states, such as during the deploy, application install, and/or production states.

In yet another implementation, the development team may desire to perform a provisioning operation on the particular deployed VM 230 that may be in the provision state. For example, client device 210 may receive a request to customize the particular deployed VM 230, such as configure security settings, configure backup schemes, establish access rights and/or protocols and/or configure disks. In response to the request, client device 210 may, via the VM function, direct storage area network 260 to configure disks and/or backup schemes in a manner prescribed by the development team and/or the VM function and/or may direct PM environment 270 to establish security settings and/or access protocols, etc.

The VM function may send a handover message to a user and/or the development team indicating the success or failure of the update operation and/or the provision operation. Additionally and/or alternatively, the VM function may automatically send a handover message to a user and/or to the development team indicating the success or failure of the update operation and/or provision operation. If the provision operation is determined to be successful, the VM function may change the state of the deployed VM 230 from the provision state to the application install state.

An application install operation may be performed on a provisioned VM 230 (block 815). For example, the VM function may enable the development team to manually install applications in accordance with specification information associated with the particular provisioned VM 230. The VM function may enable the development team to perform quality testing to confirm successful application install operations. In another example, the VM function may automatically install particular system applications and/or may perform data calls to/from storage area network 260 and/or database 220 to update disks and/or databases associated with the provisioned VM 230. The VM function may perform testing operations to confirm successful application installation and/or proper performance of the provisioned VM 230.

The VM function may send a handover message to a user and/or to the development team indicating the success or failure of the application install operation. Additionally, or alternatively, the VM function may automatically send a notification message to a user and/or the development team indicating the success or failure of the application install process.

Go live operations and production support operations may be performed (block 820). For example, client device 210 may receive a request to perform a go live operation corresponding to a particular VM 230 in the production state and in a manner similar to that described above (at blocks 705-710, FIG. 7), client device 210 may display a VM listing user interface (e.g., VM listing user interface 600 of FIG. 6A) showing particular deployed VMs 230 in the application install state.

In one implementation, for example, the development team may select the particular VM 230 for the go live operation by checking a particular box (e.g., the select VM box 636 associated with the VM listing user interface 600 of FIG. 6A) corresponding to the particular VM 230 within the VM listing user interface. The development team may send a go live request to client device 210 by selecting a button in the VM listing user interface (e.g., by selecting the "GO LIVE—Windows VM(s) button 640-3 or the "GO LIVE—Non-Windows VM(s)" button 640-4 associated with VM listing user interface 600 of FIG. 6A). Client device 210 may receive the go live request, which may cause the VM function to automatically power up the particular VM 230 deployed in Virtual Center environment 280. The power up operation may cause the particular VM 230, and particular applications and/or functions associated with the particular VM 230 to become accessible to the user and/or the VM 230 IP address to become discoverable in Virtual Center environment 280. If the VM function determines that the go live operation was successful, the VM function may change the state of the VM 230 from the application install state to the production state.

In another implementation, for example, bulk go live operations may be performed in a manner similar to that described above (at block 705-710, of FIG. 7). For example, the development team may select multiple deployed VMs 230, with a particular type of operating system, and may select a particular go live button on VM listing user interface. The VM function may, in response to the click of a single go live button, automatically and/or concurrently power up multiple deployed VMs 230 within Virtual Center environment 280.

In yet another implementation, bulk go live operations may be performed on multiple deployed VMs 230 with different types of operating systems. For example, the development team may select multiple deployed VMs 230, with a mixture of windows and non-windows operating systems, and, in a manner similar to that described immediately above, may automatically and/or concurrently power up multiple VMs 230 in the Virtual Center environment 280.

In still another implementation, maintenance operations may be performed. For example, the VM function may automatically schedule maintenance operations and/or send alerts and/or maintenance notifications, via client device 210, to a user and/or the development team in accordance with specification information (e.g., VM maintenance schedule information) associated with a particular VM 230. Additionally, or alternatively, the VM function may automatically schedule patching operations and/or may cause PM environment 270, via client device 210, to automatically send update patches to the particular production VM 230 in accordance with the specification information (e.g., VM patching schedule information) associated with a particular VM 230.

A decommission operation may be performed on production VMs 230 (block 825). When the applications and/or services associated with a particular production VM 230 are no longer desired, the production VM 230 may be decommissioned and/or otherwise removed from service. For example, client device 210 may receive a request to perform a decommission operation on a production VM 230 and, in a manner similar to that described above (at blocks 705-710, of FIG. 7), client device 210 may display a VM listing user interface (e.g., similar to VM listing user interface 600 of FIG. 6A).

Furthermore, in a manner similar to that discussed above (at block 745-750), the development team may, from the VM listing user interface, select the particular VM 230 for the decommission operation and may send a decommission request to client device 210 by selecting a particular button in the VM listing user interface (e.g., by selecting the "DECOMMISSION" button 640-5 associated with VM listing user interface 600 of FIG. 6A). Client device 210 may receive the decommission request, which may cause the VM function to automatically direct Virtual Center environment 280 and/or PM environment 270 to perform a power down operation on the particular production VM 230. The power down operation may disable access to the powered-down VM 230 by the user of the particular VM 230. The VM function may also cause the hostname of the VM 230 to be changed for the purposes of security and/or of preventing an inadvertent power-up operation by other devices, development team and/or users. Furthermore, storage resources allocated to the powered-down VM 230 may revert back to the pool of storage resources provided by storage area network 260 and/or underlying databases 250. Additionally, or alternatively, processing and/or memory resources may revert back to the pool of resources provided by PM environment 270 and/or the underlying PM server devices 240.

In another implementation, for example, bulk decommission operations may be performed in a manner similar to that described above (at block 705-710, of FIG. 7). For example, the development team may select multiple production VMs 230 and may select a particular decommission button on the VM listing user interface. The VM function may, in response to the click of the decommission button, automatically and/or concurrently perform a power down operation on multiple production VMs 230 within Virtual Center environment 280.

FIG. 10 is a simplified diagram of exemplary automatic bulk virtual machine deployment, production, and decommission operations within a network. As shown in FIG. 10, assume a user of the client device, desires to deploy twelve VMs into the Virtual Center environment. Assume further that the user has performed a specification operation, in a manner described above (at blocks 505-535, of FIG. 5), in which the VM function has created twelve VMs, has assigned the VMs to the assigned state of the VM lifecycle, and has stored the twelve VMs in the database of the client device.

The user may request to perform a search of the network, via the VM portal, to view the twelve VMs in the assign state to prepare for a data store association operation. The client device may receive the request, via the VM portal, and may present a VM search user interface on the display of the client device. The user may enter parameters into the VM search user interface and the client device may use the VM function to perform the search based one or more search parameters associated with one or more of the twelve VMs. The search parameters may be derived from information associated with one or more of the twelve VMs (e.g., specification information, VM lifecycle state information, etc.), which may include location information (e.g., hostname, physical data cluster, Virtual Center environment, and/or logical data center, etc.), guest information (e.g., IP address and/or operating system, etc.), project information (e.g., project name and/or build engineer, etc.) and/or VM lifecycle state information (e.g., assign state). In a manner similar to that discussed above (at block 710, of FIG. 7), the client device may display a VM listing user interface, which may include information associated with one or more of the twelve VMs.

The user may perform a bulk deployment operation (indication A). In this example, assume that six of the twelve VMs may be specified to run Windows-based operating systems and six of the twelve VMs may be specified to run Solaris-based operating systems. For example, in a manner similar to that described above (at block 715-740, of FIG. 7), the user may perform an associate data store operation for each of the VMs by selecting the add data store button on the VM listing user interface, which may cause the client device to display a list of data stores that can be associated with the selected VM. The user may associate a particular data store, with adequate free space, with the selected VM. The particular data store free space may be at least approximately equal to or greater than the specified VM resource limits associated with the selected VM with which the particular data store may be associated.

In a manner similar to that described above (at blocks 745-760, of FIG. 7), the user may select, for deployment, the six VMs specified to run on the Windows-based operating system, with associated data stores (e.g., data stores partitioned from the storage area network corresponding to the six VMs), by selecting (e.g., with a pointing device) the "select VM" box within the VM listing user interface. The user may, with a single click of the mouse on the "deploy Windows-based VMs" button within the VM listing user interface, cause the VM function to automatically and/or concurrently initiate a bulk deployment operation, in which the six VMs may be deployed to the Virtual Center environment. The user may repeat the bulk deployment operation for the non-Windows-based VMs, with associated data stores, by selecting the "deploy non-Windows-based VMs" button.

The user may perform a bulk "go live" operation (indication B). In this example, assume that the twelve deployed VMs were successfully deployed (e.g., processing and memory resources were successfully allocated by the PM environment and/or that storage resources were successfully partitioned by storage area network, etc.). Assume further that, in a manner similar to that described above (at blocks 810 and 815, of FIG. 8), that the twelve VMs, now in the application install state, were successfully provisioned, updated and/or reconfigured, and/or that applications were successfully installed and quality tests were successfully performed.

The user may perform a bulk "go live" operation and, in a manner similar to that described above (at block 820, of FIG. 8), may select the six VMs with Solaris-based operating systems for the go live operation. The user may, with a single click of the mouse on the "go live non-Windows-based VMs" button within the VM listing user interface, cause the VM function to initiate a bulk go live operation, in which the six VMs may be automatically and/or concurrently powered up in the Virtual Center environment. The user may repeat the bulk operation process for the Windows-based VMs, by selecting the "go live Windows-based VMs" button into the Virtual Center environment. The power up operation may cause the powered-up VMs, and particular applications and/or functions associated with the powered-up VMs, to become accessible to the user and/or may cause the IP addresses associated with the powered-up VMs to become discoverable in the Virtual Center environment.

At some point later, the user may perform a bulk decommission operation (indication C). In this example, assume that the powered-up VMs were successfully powered up and the VM function has moved the powered-up VMs to the production state (e.g., production VMs). Assume further that the production VMs have served their intended purpose and that the user no longer requires the services provided by the production VMs.

The user may perform a bulk decommission operation and, in a manner similar to that described above (at block 825, of FIG. 8), may select the twelve production VMs for the bulk decommission operation. The user may, with a single click of the mouse on the "decommission" button within the VM listing user interface, cause the VM function to initiate a bulk power down operation, in which the twelve production VMs may be automatically and/or concurrently powered down in the Virtual Center environment. The power down operation may disable access to the powered-down VMs by the user. The VM function may also cause the hostname of the powered-down VMs to be changed. Storage, processing and/or memory resources allocated to the powered-down VMs may revert back to storage area network and/or the PM environment to be used for other purposes.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5, 7 and 8, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as an ASIC or FPGA, or a combination of hardware and software (e.g., a processor, executing software).

Also, while certain user interfaces have been described above, in another implementation, the user interfaces may include additional, fewer, different, or differently arranged data items.

The term "concurrent" or "concurrently," as used herein, may correspond to an operation being performed on two or more devices (e.g., VMs 230) in a concurrent and/or parallel manner (e.g., at the same time or approximately the same time). Additionally, or alternatively, the term "concurrent" or "concurrently," as used herein, may correspond to an operation being performed on two or more devices in a partially concurrent manner in which an operation may be performed on two or more devices in parallel (e.g., at approximately the same time) and one or more other devices immediately before or after the parallel operation starts or ends.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a client device, a first request to deploy a plurality of virtual devices,
     the first request including specification information corresponding to the plurality of virtual devices;
   providing, by the client device and based on the received request, storage information of a network associated with the client device;
   receiving, by the client device and based on the storage information, a selection of two or more of the plurality of virtual devices resulting in two or more selected virtual devices;
   receiving, by the client device, a second request to perform a bulk deployment operation on the two or more selected virtual devices;
   instructing, by the client device and based on the second request, the two or more selected virtual devices to be automatically and concurrently deployed in accordance with the specification information associated with the two or more selected virtual devices;
   determining, by the client device, whether the deployment of the two or more selected virtual devices is successful;
   changing, by the client device and when the deployment is successful, a respective state of the two or more selected virtual devices from a clone state to a deploy state;
   changing, by the client device and when the deployment is not successful, a respective state of the two or more selected virtual devices from the clone state to an assign state;
   receiving, by the client device and when the deployment is successful, a third request to perform an operation on a deployed virtual device of the two or more deployed virtual devices;
   causing, by the client device and based on the third request, the deployed virtual device to be automatically powered up, resulting in a powered up virtual device;
   receiving, by the client device, a fourth request to perform an operation on one or more selected virtual devices of the plurality of virtual devices,
     the one or more selected virtual devices being different from the two or more selected virtual devices; and
   deploying, by the client device and based on the fourth request, the one or more selected virtual devices.

2. The method of claim 1, further comprising:
   receiving a fifth request to perform a decommission operation on the powered up virtual device; and
   causing, based on the fifth request, the powered up virtual device to be automatically powered down.

3. The method of claim 1, where the third request corresponds to a request to perform a bulk production operation on the two or more deployed virtual devices; and
   where causing, based on the third request, the deployed virtual device to be automatically powered up includes automatically and concurrently powering up the two or more deployed virtual devices resulting in two or more powered up virtual devices, where the powered up virtual device is one of the two or more powered up virtual devices.

4. The method of claim 3, where causing the two or more deployed virtual devices to be automatically and concurrently powered up includes making the two or more powered up virtual devices discoverable to the client device and accessible to a user of the client device.

5. The method of claim 1, further comprising:
   receiving a fifth request to perform a bulk decommission operation on two or more powered up virtual devices; and
   causing, based on the fifth request, the two or more powered up virtual devices to be automatically and concurrently powered down.

6. The method of claim 1, where instructing the two or more selected virtual devices to be automatically and concurrently deployed further comprises:
   storing the two or more deployed virtual devices in two or more data stores of a plurality of data stores.

7. The method of claim 1, where instructing the two or more selected virtual devices to be automatically and concurrently deployed further comprises:
   performing a provisioning operation on the two or more deployed virtual devices resulting in two or more provisioned virtual devices; and
   performing an application install operation on the two or more provisioned virtual devices.

8. The method of claim 7, where performing the provisioning operation includes at least one of:
   configuring storage devices associated with the two or more provisioned virtual devices;
   establishing security settings associated with the two or more provisioned virtual devices; or
   configuring backup schemes associated with the two or more provisioned virtual devices.

9. The method of claim 1, where receiving the first request to deploy the plurality of virtual devices further comprises:
   providing, for presentation and by the client device, a user interface to a user of the client device,
     the user interface including information regarding the plurality of virtual devices; and
   receiving, via the user interface and from the user, at least one of the second request or the third request.

10. The method of claim 1, further comprising:
    generating, based on the first request, the plurality of virtual devices resulting in a plurality of deployed virtual devices;

assigning a first state to the plurality of deployed virtual devices, the first state being associated with a virtual device lifecycle;
assigning a second state to the two or more deployed virtual devices, the second state being associated with the virtual device lifecycle; and
assigning a third state to the powered up virtual device, the third state being associated with the virtual device lifecycle.

11. The method of claim 1, where the second request to perform the bulk deployment operation is received, via a user interface presented by the client device, when a user of the client device selects a single button on the user interface.

12. A system comprising:
a user device, including a processor, to execute instructions, stored in a memory of the user device, to:
receive a first request to perform a search operation for a plurality of virtual devices,
the first request including a plurality of parameters associated with the plurality of virtual devices;
retrieve, based on the plurality of parameters, storage information of a network associated with the user device and the plurality of virtual devices;
receive, based on the storage information, a second request to perform a bulk deployment operation on two or more virtual devices of the plurality of virtual devices;
perform, based on the second request, the bulk deployment operation to automatically deploy the two or more virtual devices;
determine whether the bulk deployment operation of the two or more virtual devices is successful;
change, when the bulk deployment operation is successful, a respective state of the two or more virtual devices from a clone state to a deploy state;
change, when the bulk deployment operation is not successful, a respective state of the two or more virtual devices from the clone state to an assign state;
receive a third request to perform a deployment operation on one or more selected virtual devices of the plurality of virtual devices,
the one or more selected virtual devices being different from the two or more virtual devices;
deploy, based on the third request, the one or more selected virtual devices;
receive a fourth request to perform a go live operation on the one or more selected virtual devices; and
perform, based on the fourth request, the go live operation to automatically power up the one or more selected virtual devices resulting in one or more production virtual devices.

13. The system of claim 12, where the user device is further to:
receive a fifth request to perform another operation on the two or more virtual devices; and
perform, based on the fifth request, the other operation to automatically power up the two or more virtual devices resulting in two or more production virtual devices.

14. The system of claim 13, where the user device is further to:
receive a sixth request to perform a concurrent decommission operation on the two or more production virtual devices; and
perform, based on the sixth request, the concurrent decommission operation to automatically power down the two or more production virtual devices.

15. The system of claim 12, where the user device is further to:
receive a fifth request to perform a decommission operation on the one or more production virtual devices; and
perform, based on the fifth request, the decommission operation to automatically power down the one or more production virtual devices.

16. The system of claim 12, where the user device is further to:
retrieve, from a storage device and based on the first request, a plurality of visual user interface data items; and
provide, for presentation, a visual user interface based on the plurality of visual user interface data items,
the visual user interface including information associated with the plurality of virtual devices.

17. The system of claim 16, where the user device is further to:
receive, via the visual user interface, a selection of a virtual device of the plurality of virtual devices;
retrieve, from the storage device and based on the selection, specification information associated with the virtual device and a plurality of other visual user interface data items;
provide, for presentation, another visual user interface based on the plurality of other visual user interface data items,
the other visual user interface including the specification Information; and
receive, via the other visual user interface, an instruction to edit or reconfigure the specification information.

18. The system of claim 12, where the second request to perform the bulk deployment operation is received based on information indicating a user selection of a button provided by the user device.

19. A device comprising:
a memory to store instructions; and
a processor to execute the instructions to:
receive a request;
perform a search, based on the request, for a plurality of virtual devices;
provide, based on the request, storage information of a network associated with the device and the plurality of virtual devices;
retrieve, based on performing the search and the storage information, information regarding the plurality of virtual devices;
select two or more virtual devices of the plurality of virtual devices;
perform a bulk deployment operation on the two or more virtual devices based on the selection;
determine whether the bulk deployment operation performed on the two or more virtual devices is successful;
change, when the bulk deployment operation is successful, a respective state of the two or more virtual devices from a clone state to a deploy state;
change, when the bulk deployment operation is not successful, a respective state of the two or more virtual devices from the clone state to an assign state;
assign state information associated with a virtual device lifecycle to a virtual device of the two or more virtual devices;
update the state information assigned to the virtual device based on whether at least one of the bulk deployment operation, a bulk power up operation, or a bulk power down operation is performed on the virtual device; and send a notification when the state information assigned to the virtual device is updated.

20. The device of claim 19, where the processor, when selecting the two or more virtual devices of the plurality of virtual devices, is further to:

select two or more virtual devices of the plurality of virtual devices based on the storage information.

21. The device of claim 19, where the processor is further to:

receive another request to perform a go live operation on at least one of the two or more virtual devices; and perform, based on the other request, the go live operation to power up the at least one of the two or more virtual devices.

* * * * *